(12) United States Patent
Xing et al.

(10) Patent No.: US 10,875,783 B2
(45) Date of Patent: Dec. 29, 2020

(54) METHOD FOR CONTINUOUSLY PREPARING NANO ZINC OXIDE WITH MEMBRANE REACTOR

(71) Applicant: NANJING UNIVERSITY OF TECHNOLOGY, Jiangsu (CN)

(72) Inventors: Weihong Xing, Nanjing (CN); Zhilong Xu, Nanjing (CN); Nanping Xu, Nanjing (CN); Zhaoxiang Zhong, Jiangsu (CN); Feng Zhang, Nanjing (CN)

(73) Assignee: NANJING UNIVERSITY OF TECHNOLOGY, Nanjing (CN)

( * ) Notice: Subject to any disclaimer, the term of this patent is extended or adjusted under 35 U.S.C. 154(b) by 0 days.

(21) Appl. No.: 15/306,491

(22) PCT Filed: Sep. 12, 2014

(86) PCT No.: PCT/CN2014/086351
§ 371 (c)(1),
(2) Date: Oct. 25, 2016

(87) PCT Pub. No.: WO2015/161615
PCT Pub. Date: Oct. 29, 2015

(65) Prior Publication Data
US 2017/0044021 A1  Feb. 16, 2017

(30) Foreign Application Priority Data
Apr. 25, 2014 (CN) .......................... 2014 1 0173015

(51) Int. Cl.
*C01G 9/02* (2006.01)
*B01J 14/00* (2006.01)
(Continued)

(52) U.S. Cl.
CPC ............... *C01G 9/02* (2013.01); *B01J 14/00* (2013.01); *B01J 19/2415* (2013.01);
(Continued)

(58) Field of Classification Search
CPC ..... C01G 9/02; B01J 19/2415; B01J 19/2475; B01J 14/00; B01J 2219/00033; B82Y 30/00
See application file for complete search history.

(56) References Cited

PUBLICATIONS

Wang, Yujun, et al. "Preparation of ZnO nanoparticles using the direct precipitation method in a membrane dispersion microstructured reactor." Powder Technology 202.1 (2010): 130-136.*
(Continued)

*Primary Examiner* — Richard M Rump
(74) *Attorney, Agent, or Firm* — PROI Intellectual Property US

(57) ABSTRACT

The present invention relaters to a method for continuously preparing a nano zinc oxide with a membrane reactor. A zinc salt solution and a precipitator solution required for the preparation of a zinc oxide are respectively used as dispersion phases, and under the action of a certain pressure, the two reaction solutions respectively penetrate through a membrane tube at a certain rate and disperse quickly under the action of a shear force and react, producing a precursor precipitate. A precursor suspension penetrates through the membrane tube continuously and circularly after being pressurized by a pump, and at the same time, deionized water as a washing fluid is added to a suspension storage tank, wherein impurity ions penetrate through membrane pores and are discharged along with the liquid medium; after the concentration of the impurity ions meets requirements, the concentrated solution is discharged continuously and then spray-dried to obtain a basic zinc carbonate precursor powder. The basic zinc carbonate powder is calcined under certain conditions to obtain the nanostructured zinc oxide
(Continued)

powder. The continuous preparation and washing of a powder can be achieved by coupling a membrane washing technique with a membrane dispersion technique. The procedure is simple, the structure of zinc oxide is easy to control and the yield is high.

9 Claims, 3 Drawing Sheets

(51) Int. Cl.
    *B01J 19/24*     (2006.01)
    *B82Y 30/00*     (2011.01)

(52) U.S. Cl.
    CPC .. *B01J 19/2475* (2013.01); *B01J 2219/00033* (2013.01); *B82Y 30/00* (2013.01); *C01P 2002/72* (2013.01); *C01P 2004/03* (2013.01)

(56) References Cited

PUBLICATIONS

Huang, Cui, Yujun Wang, and Guangsheng Luo. "Preparation of highly dispersed and small-sized ZnO nanoparticles in a membrane dispersion microreactor and their photocatalytic degradation." Industrial & Engineering Chemistry Research 52.16 (2013): 5683-5690.*

* cited by examiner

METHOD FOR CONTINUOUSLY PREPARING NANO ZINC OXIDE WITH MEMBRANE REACTOR

TECHNICAL FIELD

The Invention relates to a method for preparing nano zinc oxide and particularly to a method for continuously preparing nano zinc oxide with membrane reactor.

BACKGROUND ART

As a kind of wide bandgap semiconductor material, zinc oxide, with the unique optical and electrical properties, has been widely studied and also has extensive potential application in the fields of gas sensitive materials, piezoelectric materials, nanometer devices, solar cells and optical elements. With porous structure and high specific surface area, zinc oxide in three-dimensional structure keeps the existing particularity of nanometer material and has better stability, which has received increasing attention in the fields of photocatalysis, air-sensitivity and sensor.

Zinc oxide in three-dimensional structure has been prepared by numerous researchers by means of hydrothermal synthesis, as reported in the current literatures. The process requires high temperature, high pressure and low reactant concentration, which consumes time and energy and leads to low yield. Meanwhile, direct precipitation method has its own disadvantages in preparing nano powder. In the traditional stirred tank reactor, one raw material is directly dripped into another material, resulting in serious local reaction, which is hard to obtain the particle with uniform size and shape. Additionally, impurity ion adsorbed on the particle surface from liquid phase reaction can affect the particle performance and should be washed and purified. Solid-liquid separation and washing of ultra-fine particle has become a key process that restricts large-scale production of ultra-fine powder by wet chemistry method. The traditional washing mode leads to high product loss ratio and more water consumption.

Chinese Patent Application CN103046132A has disclosed a method for preparing nano zinc oxide in flower-type structure. In the method, the solution mixed with ethyl alcohol, benzyl alcohol, zinc slat and urea is prepared and transferred to the reactor after 1 h constant stirring and reacts for five hours at 200° C. under argon atmosphere to obtain the zinc oxide precursor after another 1.5 h reaction at 265° C.; porous flowerlike zinc oxide powder can be obtained after 5 h calcination of precursor at 500° C. However, this time-consuming method requires high temperature, high pressure, and organic solvent and complicated preparation process.

Chinese Patent Application CN1944708A has disclosed a method for compounding series of petaloid zinc oxide micro-nano structure by hydrothermal method at lower temperature. Chinese Patent Application CN103241764A has disclosed a method for preparing zinc oxide in 3D petaloid structure at 5-70° C. The above two methods reduce the preparation temperature of zinc oxide, but require substrate template, where zinc oxide precursor grows, to obtain zinc oxide in 3D petaloid structure through calcination, which is against large-scale rapid preparation. Chinese Patent Application CN101433815A has disclosed a kind of membrane-distributed micro-channel reactor for preparing nano barium sulfate particle, while Chinese Patent Application CN1318429A has also disclosed a method for preparing ultrafine particle by membrane dispersion. However, in these two methods, only one kind of reaction solution is taken as the dispersion phase with mixing effect under restriction, and no subsequent washing and purification process is involved, resulting in inadequate continuous production. Chinese Patent Application CN1289632A has disclosed a method for preparing ultrafine powder by inorganic membrane integrated technology. In the method, only ultrafine powder washing is focused, but membrane reactor application in powder preparation and combination between membrane reactor and membrane washing has not been mentioned, which is not conducive to continuous preparation of powder, especially to effective control of particle size, structure and shape of powder.

SUMMARY OF THE INVENTION

The purposes of the Invention are to improve the prior art and provide a method for continuously preparing nano zinc oxide with membrane reactor.

The technical scheme of the Invention is to continuously prepare zinc oxide precursor particle with particle size and shape controlled, by promoting mass transfer effect of reaction solution with double hollow membrane dispersion and directly precipitating at room temperature combined with membrane washing, and to calcine under certain conditions, so as to prepare zinc oxide in 3D structure. Compared with hydrothermal method, direct precipitation method is featured with simple process and cheap and available raw materials, which can realize continuous production. However, particle size and shape can be affected by supersaturation degree. Therefore, keeping uniform supersaturation degree is conducive to obtaining particle with uniform size and shape. The reaction solution can remarkably strengthen mixture of the two solutions via membrane pore dispersion, which is of great significance to preparing micro-nano material with uniform size and shape by direct precipitation method. In the Invention, powder preparation process by means of membrane dispersion is combined with powder washing process so as to realize continuous preparation of powder, simplify the preparation process, reduce powder loss and washing water consumption and improve yield.

The technical scheme of the Invention is a method for continuously preparing nano zinc oxide with membrane reactor, with the specific steps as follows: zinc salt solution and precipitator solution are put into the reactor membrane tube for dispersion via metering pump at a certain charging ratio and disperse to the reactor from membrane tube by stirring; with the temperature of reactor controlled, the dispersed droplets are uniformly mixed for nucleation and reaction in the reactor to produce suspension solution containing solid which is pumped from the reactor to the storage tank; the suspension solution containing solid inside the storage tank flows through the washing membrane tube in cross flow after being pressurized by a centrifugal pump, wherein part of solutions and impurity ions are discharged from membrane pores and cycled after flowing from the membrane tube. At the same time, deionized water is added into the storage tank. After the concentration of the impurity ions in the solution penetrating through the membrane tube meets the requirement, the concentrated solution is continuously discharged via the discharge valve and then spray-dried to obtain the precursor powder; zinc oxide powder in multilayer nano-structure is obtained after the precursor powder is calcined.

Zinc acetate, zinc nitrate, zinc chloride or zinc sulfate solution is preferably chosen as zinc salt solution; ammonium bicarbonate, sodium bicarbonate or sodium carbonate solution is preferably chosen as precipitator solution; the concentration of zinc salt solution is preferably 0.25~1.0 mol/L; the concentration of precipitator solution is preferably 0.25~2.0 mol/L; the mole ratio $M_{precipitator}/M_{zinc\ salt}$ of the two reactants is 2~6. The charging rate of zinc salt solution and precipitator solution is preferably 200~1000 L/(m$^2$·h); the stirring speed of reactor is 250~1000 rpm/min.

The aperture of membrane tube for dispersion and that for washing is preferably 0.02~1.0 μm; the membrane tube for dispersion and that for washing are of stainless steel membrane or ceramic metal oxide membrane. The aperture of membrane tube for dispersion is more preferably 0.02~0.02 μm; the aperture of membrane tube for washing is more preferably 0.5~4.0 μm.

Temperature of reactor is preferably 25~40° C. Normal concentration of impurity ion in penetrating liquid is preferably 3.0~5.0 mg/L.

Pressure range of solution containing solid in storage tank applied via centrifugal pump is preferably 0.1~0.5 MPa; the cross flow velocity is 1.0~5.0 m/s.

Calcination temperature is preferably 300~500° C. and the calcination time is 0.5~2.0 h.

In the Invention, the size and shape of zinc oxide powder can be controlled through controlling the aperture of membrane tube, reactant proportioning, dispersion rate, stirring speed and temperature of reactor; the size of zinc oxide grain can also be controlled by changing the calcination condition of precursor.

In the Invention, the mixing effect of the two reaction solutions is improved using the dispersive mixing method to realize instant mixing and ensure uniform supersaturation and growing environment of crystal nucleus. The growing time of crystal nucleus can be controlled by controlling the standing time of crystal nucleus in the reactive tank. Due to continuous reaction and uniform growing time and environment of crystal nucleus, the final precursor is of the same size and shape. The suspension solution of precursor continuously penetrates membrane tube in cross flow after pressurized via a pump and pure water is successively added to storage tank to remove impurity ions by washing. With the advantage of continuous washing, membrane washing method can remarkably reduce washing water consumption, simplify powder preparation process, and improve powder recovery.

In the Invention, equipment used in continuously preparing nano zinc oxide powder with membrane dispersion includes membrane tube, charging pump, reactor, booster pump, discharge valve and liquid storage tank and separating membrane for powder washing.

The inorganic membrane adopted in this method is of symmetrical or asymmetrical porous membrane made of inorganic metal or metallic oxide materials. As for contamination on membrane surface, the membrane tube for washing is subject to backwash to recover the flux. The feeding pump is of metering pump and the centrifugal pump is used for transferring and pressurizing suspension solution.

In the Invention, the precursor in petaloid structure is prepared and obtained at room temperature and then calcined to obtain the relevant zinc oxide in multilayer nano-structure, providing a new way to prepare other micro-nano powder.

Beneficial Effects:

Combining a membrane dispersion technique with a membrane washing technique, the Invention utilizes the micro-porous structure of membrane to disperse the reaction solution in tiny droplets and to promote mass transferring, so as to prepare the precursor particle with uniform size and shape. The precursor is washed and purified by means of membrane washing to ensure the product purity. Additionally, in the method, parameters of the whole preparation process can be effectively controlled respectively, i.e. controlling the mixing effect of reaction solution by changing membrane pore size and dispersion rate, and controlling the sample purity by controlling the content of impurity ions in the washing water. Advantages of the Invention include strengthened mass transferring during reaction, continuous precipitation reaction, powder preparation and washing process conducted simultaneously, fully continuous production, controlled size and shape of product, good particle monodispersity, narrow size distribution and uniform shape.

DETAILED DESCRIPTION OF THE PREFERRED EMBODIMENTS

Figure 1:
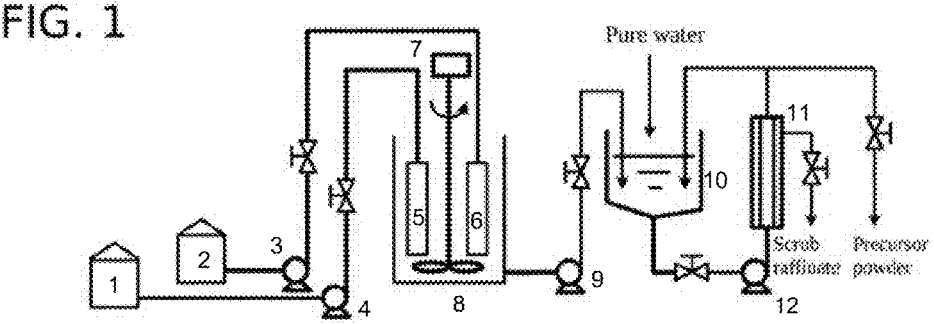
FIG. 1 is a structural diagram of equipment used in the Invention, wherein: 1—storage tank for precipitator solution; 2—storage tank for zinc salt solution; 3—metering pump No. 1; 4—metering pump No. 2; 5—dispersion membrane tube No. 1; 6—dispersion membrane tube No. 2; 7—stirrer; 8—reactor; 9 and 12—centrifugal pump; 10—storage tank; 11—separating membrane component.
Figure 2:
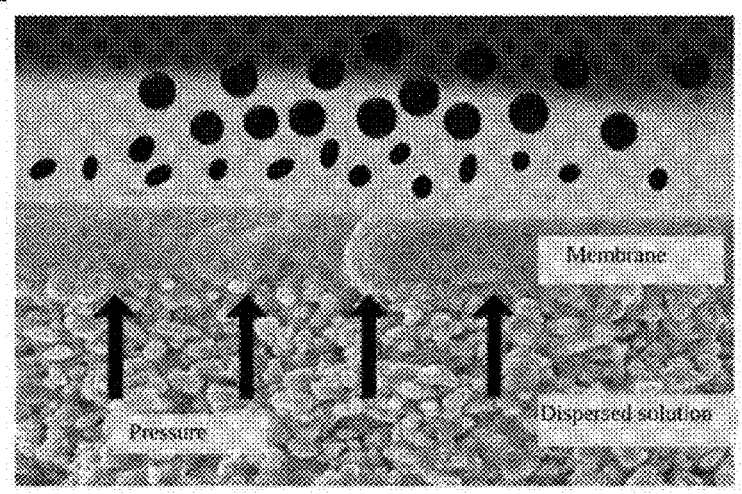
FIG. 2 is a schematic diagram of membrane dispersion.

Refer to FIG. 1 for structure diagram of equipment used in Embodiments: precipitator solution in storage tank 1 is added into dispersion membrane tube 1 from metering pump 1 and then penetrates into reactor 8 from the membrane tube; precipitator solution in storage tank 2 is added into dispersion membrane tube 2 from metering pump 2 and then penetrates into reactor 8 from the membrane tube. The two reaction solutions in the reactor are mixed rapidly and react with each other with the action of stirrer 7. The produced suspension solution is transferred to storage tank 10 from pump 9 and pure water is added to the storage tank; the feed solution is sent to membrane component 11 in cross flow under pressure via centrifugal pump 12 for constant circulation; the washing penetrating solution is discharged and samples are taken for analysis. Metering pump 3 and 4 are used to adjust mole ratio of the two reaction solutions and centrifugal pump 12 is used to adjust the pressure in powder washing process. After the concentration of the impurity ions in washing solution meets requirements, the concentrated solution is discharged via discharge valve and then spray-dried to obtain the precursor powder. The precursor powder is calcined under certain conditions to obtain the zinc oxide powder. Refer to FIG. 2 for the schematic diagram of membrane dispersion; due to numerous micro-porous structure of membrane tube, the reaction solution penetrating the membrane tube is dispersed into many tiny droplets under a certain pressure and spreads out with the action of stirring shear force.

Embodiment 1

Figure 3:
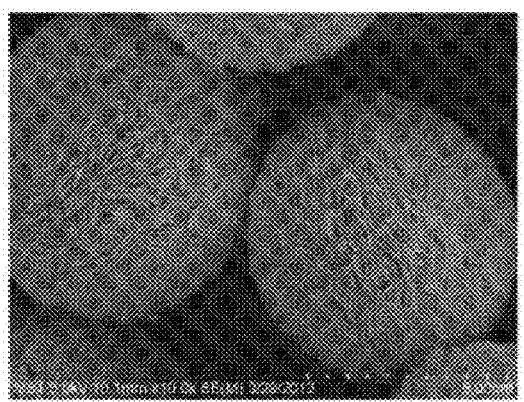
FIG. 3 is a scanning electron micrograph of precursor in Embodiment 1.

Sodium bicarbonate solution with concentration of 2.0 mol/L and zinc nitrate solution with concentration of 1.0 mol/L are prepared with mole ratio controlled at 6. The two solutions penetrate through a stainless steel metal membrane with aperture of 0.02 μm at 750 L/(m²·h) and 250 L/(m²·h) respectively and disperse out, with the stirring rate of 750 rpm/min and the reactor temperature of 30° C. The produced suspension solution is pumped to storage tank and used to wash aluminum oxide ceramic membrane with the aperture of 1.0 μm at the cross-flow velocity of 1.0 m/s after pressurized to 0.1 Mpa by centrifugal pump and deionized water is added to the storage tank at the same time. After the content of impurity ions in washing penetrating solution reaches 3.0 mg/L, the solution is discharged and spray-dried via discharge valve to obtain the basic zinc carbonate precursor microsphere with neat and uniform size and shape (FIG. 3) and to obtain the zinc oxide powder after calcined for 2.0 h at 500° C.

Embodiment 2

Figure 4:
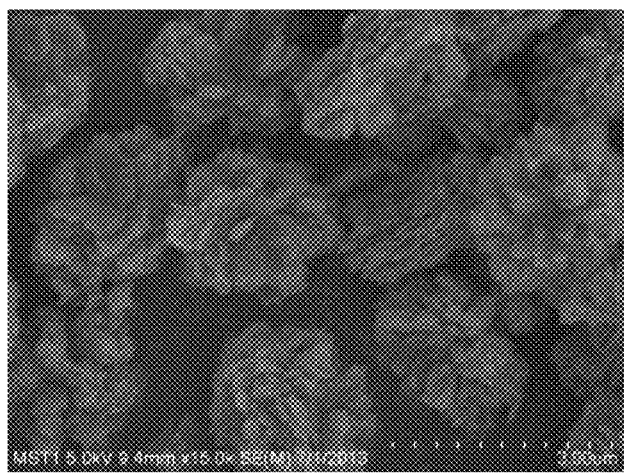
FIG. 4 is a scanning electron micrograph of precursor in Embodiment 3.

Sodium carbonate solution with concentration of 1.0 mol/L and zinc chlorate solution with concentration of 0.5 mol/L are prepared with mole ratio controlled at 4. The two solutions penetrate through a stainless steel metal membrane with aperture of 0.2 μm at 400 L/(m²·h) and 200 L/(m²·h) respectively and disperse out, with the stirring rate of 1000 rpm/min and the reactor temperature of 30° C. The produced suspension solution is pumped to storage tank and used to wash aluminum oxide ceramic membrane with the aperture of 0.5 μm at the cross-flow velocity of 5.0 m/s after pressurized to 0.5 Mpa by centrifugal pump and deionized water is added to the storage tank at the same time. After the content of impurity ions in washing penetrating solution reaches 3.0 mg/L, the solution is discharged and spray-dried via discharge valve to obtain the basic zinc carbonate precursor in petaloid structure with uniform size and shape (FIG. 4) and to obtain the zinc oxide powder after calcined for 1.5 h at 400° C.

Embodiment 3

Figure 5:
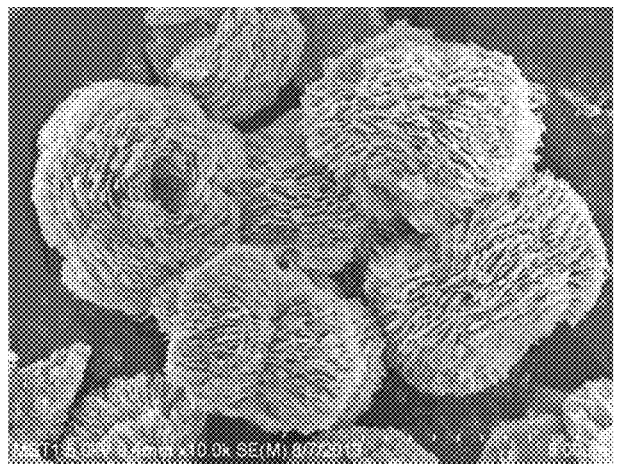
FIG. 5 is a scanning electron micrograph of precursor in Embodiment 3.
Figure 6:
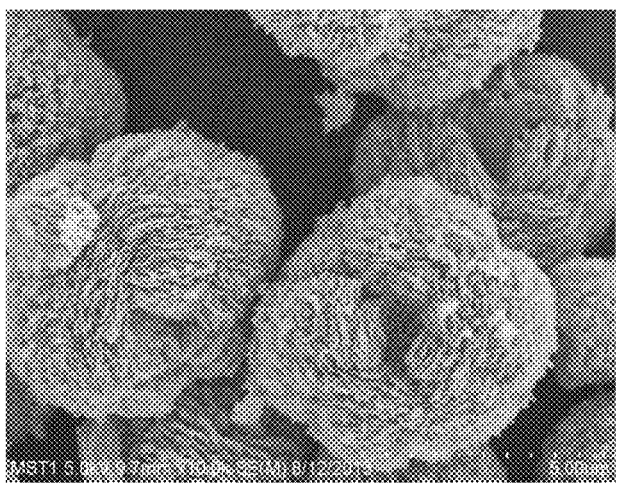
FIG. 6 is a scanning electron micrograph of zinc oxide obtained from calcined precursor in Embodiment 3.
Figure 7:
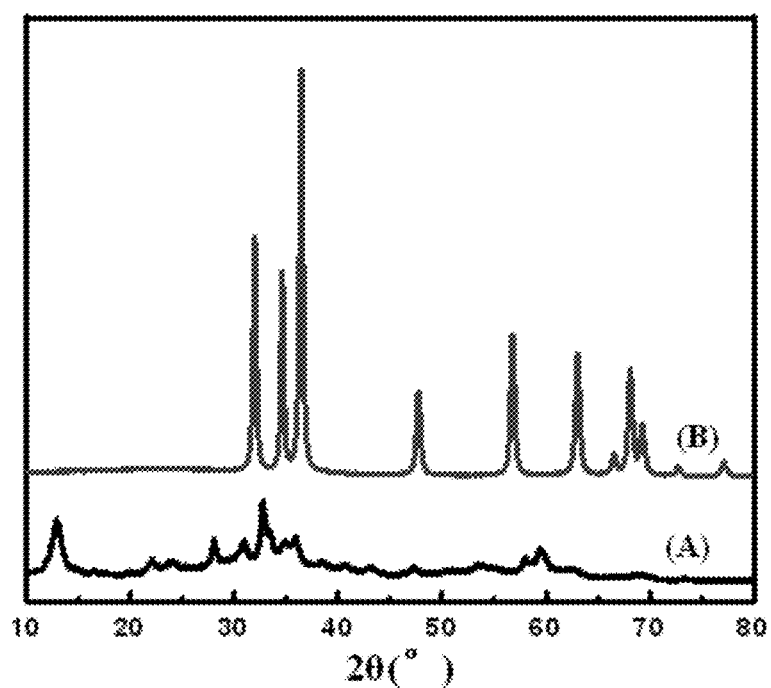
FIG. 7 is XRD diffraction peak of zinc oxide and basic zinc carbonate precursor prepared in Embodiment 3; wherein, A is XRD diffraction peak of prepared basic zinc carbonate precursor and B is XRD diffraction peak of zinc oxide.

Ammonium bicarbonate solution with concentration of 0.25 mol/L and zinc acetate solution with concentration of 0.25 mol/L are prepared with mole ratio controlled at 2. The two solutions penetrate through a zirconia ceramic membrane with aperture of 0.05 μm at 1000 L/(m²·h) and 500 L/(m²·h) respectively and disperse out, with the stirring rate of 250 rpm/min and the reactor temperature of 40° C. The produced suspension solution is pumped to storage tank and used to wash the stainless steel metal membrane with the aperture of 0.75 μm at the cross-flow velocity of 3.0 m/s after pressurized to 0.3 Mpa by centrifugal pump and deionized water is added to the storage tank at the same time. After the content of impurity ions in washing penetrating solution reaches 5.0 mg/L, the solution is discharged and spray-dried via discharge valve to obtain the basic zinc carbonate precursor in multiplayer petaloid nano-structure (FIG. 5) and to obtain the zinc oxide powder in petaloid structure (FIG. 6) after the precursor has been calcined for 0.5 h at 300° C. Unlike the precursor, the zinc oxide powder also has plentiful porous structure besides the multiplayer nano-structure; nano-zinc oxide in petaloid structure is assembled through nano-particle unit to form stable three-dimensional structure; see FIG. 7 for XRD diffraction peak of prepared basic zinc carbonate precursor and zinc oxide. The characteristic peak of zinc oxide conforms to hexagonal wurtzite structure without any other impurity peak.

The invention claimed is:

1. A method for preparing nano zinc oxide comprising: (i) pumping a zinc salt solution and a precipitating solution into membrane tubes (5) and (6), respectively; (ii) dispersing and uniformly mixing the solutions for nucleation and reaction in a reactor (8) with continuous stirring to produce a suspension containing solid particles; (iii) pumping the suspension from the reactor to a storage tank (10) to which deionized water is concurrently added for washing the solid particles; (iv) pumping the suspension with the washing water from the storage tank into a washing membrane tube (11) in a cross flow with a centrifugal pump to produce a washed preparation of particles and discard the washing water with impurities; (v) determining whether the washed preparation of particles after penetrating through the membrane tube meets a given requirement; (vi) based on the determination of step (v), either recycling the washed preparation back to the storage tank for further washing cycles, or discharging the washed preparation via a discharge valve; (vii) spray drying the discharged preparation from step (vi) to obtain a precursor powder; and (viii) calcining the precursor powder to afford a product of particles with a multilayered nano-structure.

2. The method according to claim 1, wherein the zinc salt solution is selected from the group consisting of zinc acetate, zinc nitrate, zinc chloride and zinc sulfate solution; and the precipitating solution is selected from the group consisting of ammonium bicarbonate, sodium bicarbonate and sodium carbonate solution.

3. The method according to claim 1, wherein the zinc salt solution is 0.25~1.0 mol/L; the precipitating solution is 0.25~2.0 mol/L; and the mole ratio $M_{precipitant}/M_{zinc\ salt}$ of the two reactants of the two solution is 2~6.

4. The method according to claim 1, wherein the zinc salt solution and precipitating solutions are each fed at a rate of 200~1000 L/(m²·h); and the stirring speed of reactor is 250~1000 rpm/min.

5. The method according to claim 1, wherein the membrane tube for dispersion in step (ii) and membrane tube for washing in step (iv) have apertures of 0.02~1.0 μm; and are of stainless steel metal membrane or ceramic metal oxide membrane.

6. The method according to claim 1, wherein the reactor operates at 25~40° C.

7. The method according to claim 1, wherein the given requirement in step (v) is that a concentration of impurity ion in the washed preparation is 3.0~5.0 mg/L.

8. The method according to claim 1, wherein, in step (vii), the precursor powder is calcined at 300~500° C. for 0.5~2.0 h.

9. The method according to claim 1, wherein, the storage tank is under a pressure of 0.1~0.5 MPa, applied by the centrifugal pump with a cross flow velocity at 1.0~5.0 m/s.

* * * * *